Aug. 11, 1936.   W. T. BISSELL   2,050,415
FOAM ELIMINATION IN RECLAIMING USED OILS
Filed March 11, 1935
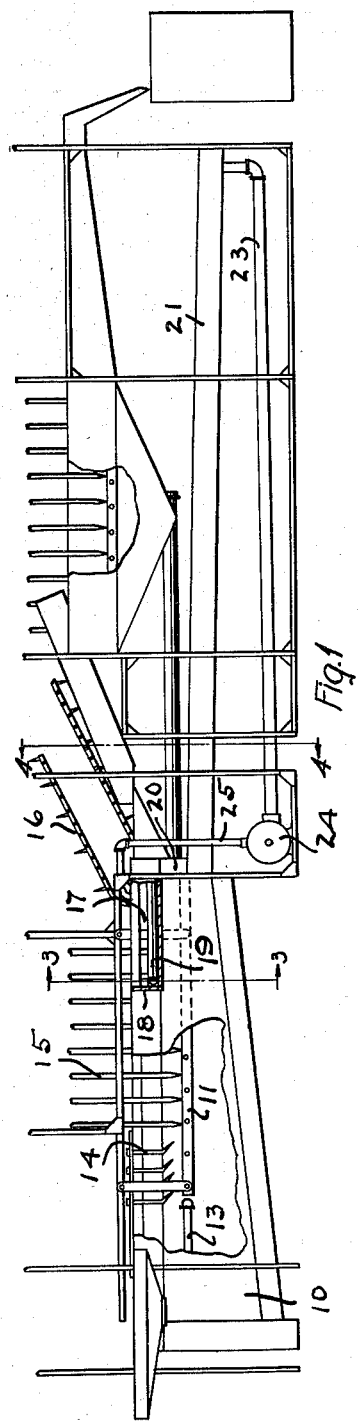
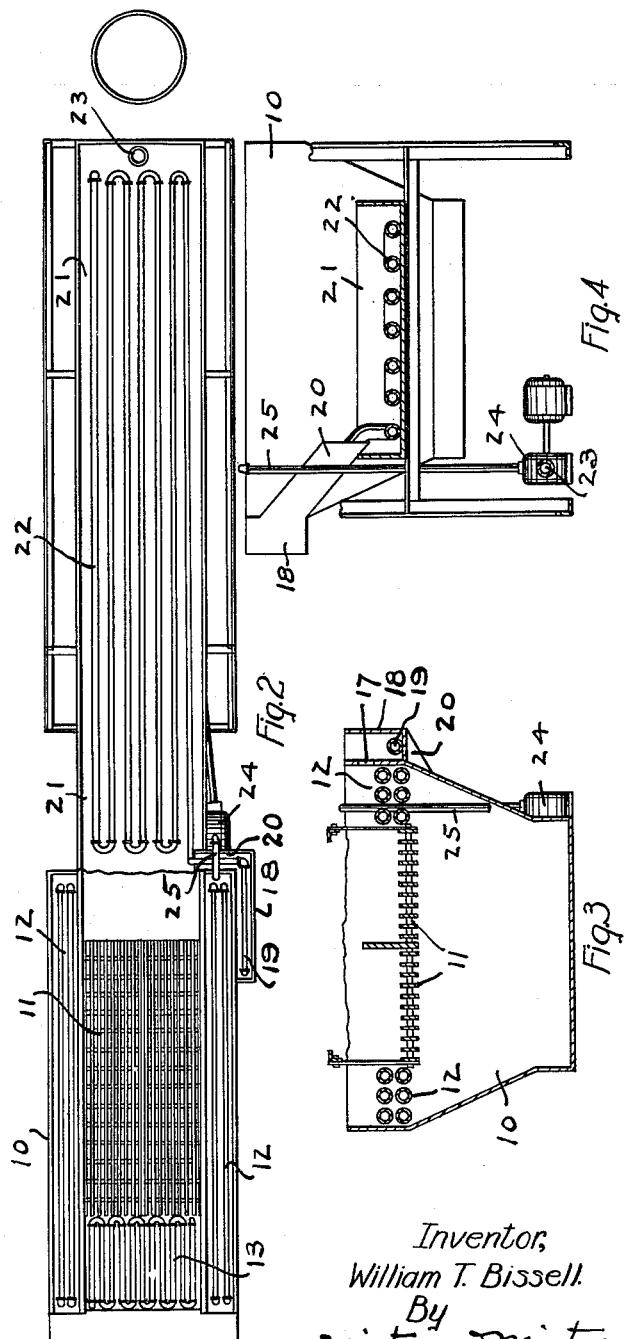
Inventor,
William T. Bissell.
By
Minturn & Minturn
Attorneys.

Patented Aug. 11, 1936

2,050,415

UNITED STATES PATENT OFFICE 2,050,415

FOAM ELIMINATION IN RECLAIMING USED OILS

William T. Bissell, Indianapolis, Ind., assignor to Journal Box Servicing Corporation, Indianapolis, Ind., a corporation of Indiana Application March 11, 1935, Serial No. 10,445

5 Claims. (Cl. 141—2)

This invention relates to the art of reclaiming used journal box waste and particularly relates to means for preventing foaming and loss of oil during the washing process.

Reference is made to the copending U. S. application for patent assigned to Journal Box Servicing Corporation, the assignee of the present application, the application bearing the Serial No. 645,222 and filing date of Dec. 1, 1932. In this application referred to and also in the U. S. Patent No. 1,783,407, the used waste is dropped into one end of a tank containing lubricating oil heated to a temperature above 212° F. A practical operating temperature is 250° F. This waste to be reclaimed is generally collected in steel drums as it is taken from the journal and thus allowed to accumulate until a considerable number of drums are on hand and then the waste is shipped into a central reclaiming plant. When these drums of waste reach this plant it is found frequently that much water has accumulated in the drums, particularly where those drums are allowed to stand in the open without being covered.

It is a primary object of my invention to provide means for preventing an excess of water carried by the dirty waste into the wash oil from causing a foaming over of the oil from the wash tank. It is also a primary object of my invention to thoroughly dry the oil and break down any emulsions that may exist therein due to the introduction of such water and further to break down those water emulsions that may have been produced in the oil in the journal itself under operating conditions. These and other objects and advantages will become apparent to those versed in the art in the following description of my invention with reference being had to the accompanying drawing, wherein Fig. 1 is a fragmentary side elevation of a washing apparatus to which my invention as applied is shown;

Fig. 2, a top plan view of the structure shown in Fig. 1 with the waste moving members removed;

Fig. 3, a vertical transverse section on the line 3—3 in Fig. 1, and

Fig. 4, a vertical transverse section on the line 4—4 in Fig. 1.

Like characters of reference indicate like parts throughout the several views in the drawing.

The apparatus as shown in the accompanying drawing is in a more or less diagrammatic form and reference is made to the Patent No. 1,783,407 of Dec. 2, 1930 for a more complete showing of the waste moving members which do not particularly enter into my present invention. The form of the apparatus herein shown is that appearing in the copending application Serial No. 645,222 above referred to and comprises essentially a wash tank 10 adapted to hold a considerable volume of oil and having a more or less horizontally disposed screen 11 placed in the upper portion of the tank. This screen 11 occupies the major central portion of the tank but room is left on either side thereof for a series of steam pipes 12 as a means for heating the oil to the desired temperature. Also in this tank is a series of steam coils 13 placed at the feeding end of the tank 10, that is at that end of the tank into which the dirty waste is introduced. The steam coils 13 from in effect a screen as a continuation of the screen 11.

The dirty waste is dropped into the tank 10 over the steam coils 13 which is the hottest part of the oil in the tank. Ordinarily the moisture carried by the waste is evaporated as the waste is fed into the heated oil at this part of the tank since the waste is held in the upper portions of the oil near the surface by the coils 13 and the heat of the oil causes prompt evaporation of the moisture before the moisture can be carried down into the oil to any considerable depth. Suitable fingers 14 and 15 are employed to move the waste along from over the coils 13 over the screen 11 where the waste is thoroughly loosened up and so manipulated as to permit a thorough cleansing of it by the wash oil in the tank 10. The waste is then carried up out of the wash tank 10 by some suitable conveyor 16.

Where the moisture in the dirty waste is found to be excessive such for example as when the drums have been left open during a heavy rain to allow the water to accumulate in the drums, the steam coils 13 can not produce enough heat fast enough to completely evaporate the water thus introduced by that waste into the wash oil before the waste and that water is carried on over onto the screen 11 into the relatively cooler oil. In this situation, this excessive water will then cause the bath oil to start foaming and if not controlled, this foaming will continue until the oil actually foams up and runs over the sides of the tank 10, thereby setting up a hazardous condition as well as causing a loss of the wash oil.

Now in order to prevent such a hazardous condition and the consequent loss, I provide at least one opening 17, Figs. 1 and 3, in the side of the tank 10 above the normal level of the wash oil so that under ordinary conditions where the coils 13 are evaporating the water as fast as it is introduced into the oil, no oil will flow out through the opening 17. However should foaming start upon the introduction of an excessive amount of water, then as the oil level or rather the foam level rises in the tank 10, this foam will pour out through the opening 17 to drop down into a collecting box 18 built along the side of the tank. I provide a steam pipe 19 in the bottom of this box 18 so that as the foam drops into the box, it will fall down onto and around the pipe 19 to start evaporation of the water at once. This box 18 is provided with a trough 20 at its outlet, here shown as on the forward end of the tank 10, to convey the foam and oil into a pan 21, here shown as being placed for the sake of convenience and the saving of space under a forward part of the waste reclaiming machine.

This pan 21 is provided with a plurality of steam pipes 22 placed over its area at the bottom thereof, but inside of the pan so that when the oil and foam come into the pan from the box 18, it must flow over and around these pipes 22 to be subjected to the heat radiated therefrom. By the time the foaming oil has traversed even a short length of this pan, due to the great amount of heat applied to the oil by these pipes 22, the foam disappears and the oil flows on forwardly free of moisture to the forward end of the pan from where it drains down through the pipe 23 back to the pump 24 which lifts the oil back up through the pipe 25 into the tank 10 so as to maintain the proper oil level therein. The level of the oil in the pan 21 depends, of course, somewhat upon the rate of flow of the foam through the opening 17 from the tank 10, but even under the most severe conditions, this level in the pan 21 does not rise to any extent above the tops of the pipes 22 so that a very thin layer of oil is had in the pan 21 permitting quick evaporation of the moisture therefrom thereby eliminating quickly the foaming condition and also breaking down and removing the emulsified state.

Thus regardless of the amount of water introduced into the wash oil in the tank 10, I am able to secure a continuous operation of the washing of the waste in the tank 10 without having to shut down the mechanism due to foaming, since the foam feeds off of the tank and is dried out and the oil returned as rapidly as the foam is produced, all without materially, at any time, losing the oil level in the tank 10 and at the same time maintaining the major part of the oil in that tank in a dry state. This excessive amount of water in the waste in some instances runs as high as five to ten gallons of water in a fifty gallon drum of waste and since the most economical manner of handling the waste is to dump the waste directly into the oil, I am able to do so without any predrying treatment of the waste since I can dry the moisture out by the highly heated oil as above indicated.

The size of the opening 17, area of the evaporating pan 21 and size of the drain pipe 23, together with the capacity of the pump 24 are all so proportioned as to prevent any excess depth of oil in the pan 21 which would rise appreciably above the tops of the pipes 22 therein.

While I have herein shown and described my invention in the best form as now known to me, it is obvious that structural changes may be made without departing from the spirit of the invention and I, therefore, do not desire to be limited to that precise form beyond the limitations as may be imposed by the following claims.

I claim:

1. The method of maintaining a substantially constant level of oil in a wash tank into which water bearing waste is introduced, comprising the step of drawing off foam rising above a predetermined level, the step of heating the foam above 212° F. to separate and drive off the moisture from the oil in the foam, and the step of returning the dried oil to said tank.

2. The method of maintaining a dried state without loss of heated oil in a wash tank into which water bearing waste is introduced which comprises heating to above 212° F. that part of the oil into which the waste is initially introduced to evaporate moisture before it reaches any considerable volume of said oil, drawing off at a predetermined level of the tank above the normal level of the oil foam as produced by an excess of moisture entering said volume, heating that foam above 212° F., spreading the foam out into relatively thin films, collecting the dried oil coming from said films, and returning the dried oil to said tank.

3. The method of maintaining a dried state without loss of heated oil in a wash tank into which water bearing waste is introduced which comprises heating to above 212° F. that part of the oil into which the waste is initially introduced to evaporate moisture before it reaches any considerable volume of said oil, drawing off at a predetermined level of the tank above the normal level of the oil foam as produced by an excess of moisture entering said volume, heating that foam above 212° F., spreading the foam out into relatively thin films, collecting the dried oil coming from said films, and returning the dried oil to said tank, said heating of the foam being while in a volume, and said films being heated to between 212° and 250° F.

4. The combination with a wash tank adapted to hold oil, and a screen in the upper portion thereof, the initial part of the screen comprising a steam heated coil, of a pan, a steam coil in the pan, said tank having a discharge opening at a level above the normal elevation of the oil therein, conducting means for carrying foam between said opening and said pan connecting said tank and pan, and oil transfer means between the pan and the tank.

5. The combination with a wash tank adapted to hold oil, means for heating the oil, a screen in the upper portion of the tank, and a steam coil forming an initial section of the screen, of a box along the tank, a heating element in the box, said tank having an opening discharging into the box, said opening being at a level above the normal level of the oil therein, a foam evaporating pan, a plurality of heating elements along the floor of the pan, conducting means between the box and the pan, and oil withdrawing means carrying oil from the pan preventing a predetermined increase in oil level therein, said withdrawing means comprising a pump having its discharge directed into said tank.

WILLIAM T. BISSELL.